United States Patent

[11] 3,614,299

[72] Inventor Thomas J. Grail
 Plainfield, N.J.
[21] Appl. No. 56,245
[22] Filed July 17, 1970
[45] Patented Oct. 19, 1971
[73] Assignee Esso Research and Engineering Company
 Continuation of application Ser. No.
 677,963, Oct. 25, 1967, now abandoned.

[54] LOW THERMAL CONDUCTIVITY CABLE CORE WRAP
 2 Claims, 2 Drawing Figs.

[52] U.S. Cl. .................................................. 174/107,
 156/53, 156/56, 174/102 D, 174/110 PM, 174/121
[51] Int. Cl. ...................................................... H01b 7/18,
 H01b 7/34
[50] Field of Search........................................... 174/107,
 102, 108, 110, 120, 121, 122, 124; 156/47, 51, 52,
 53, 54, 56; 138/34, 145, 146, 149, 121; 117/136;
 317/258

[56] References Cited
UNITED STATES PATENTS

| 3,344,228 | 9/1967 | Woodland et al. | 174/107 |
| 3,341,394 | 9/1967 | Kinney | 317/258 |
| 3,376,378 | 4/1968 | Bullock | 174/107 |
| 3,346,016 | 10/1967 | Blau et al. | 138/138 |

FOREIGN PATENTS

| 866,949 | 5/1961 | Great Britain | 138/145 |

Primary Examiner—E. A. Goldberg
Assistant Examiner—A. t. Grimley
Attorneys—Chasan and Sinnock and Michael N. Meller ABSTRACT: A thermally insulating laminate as a cable core wrap wherein the laminate consists of a at least one layer of a low bulk density, high-surface area material capable of intertrapping air in said laminate to lower thermal conductivity.

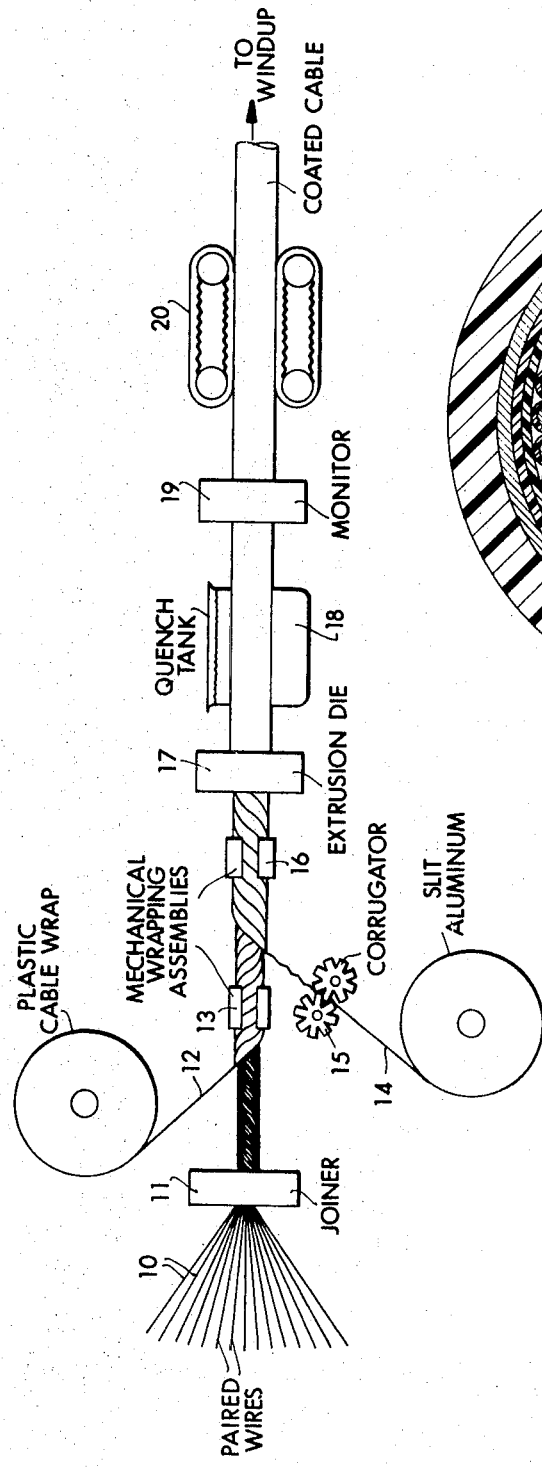
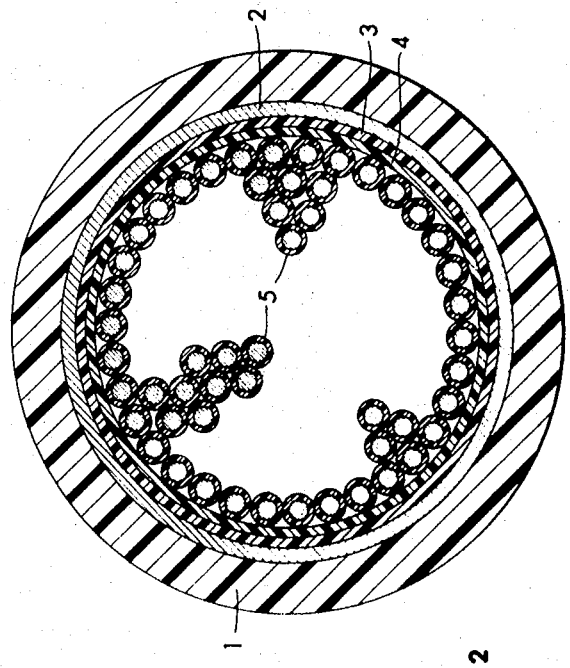
FIGURE 1
FIGURE 2
T. J. Grail INVENTOR
PATENT ATTORNEY

LOW THERMAL CONDUCTIVITY CABLE CORE WRAP

This application is a continuation of Ser. No. 677,963 filed Oct. 25, 1967 now abandoned.

BACKGROUND OF THE INVENTION

1 Field of Invention

This invention relates to cable core wraps used as thermal insulation barriers to protect cable cores from heat damage during cable fabrication processes. More particularly the cable core wrap consists of a laminated two or three-ply material, one layer of which is of a very low thermal conductivity material.

2. Description of the Prior Art

In the electric cable manufacturing art, multiple strands of wires are commonly protected by an aluminum sheath, preferably corrugated, in order to act as a conduit for the multiple strands and also to protect said strands from physical damage. These corrugated aluminum sheaths are then coated over by extrusion means with an appropriate plastic or rubber material so as to result in the commonly used electric cable employed in the cable industry.

This extrusion process, however, produces considerable amounts of heat, so much so that some additional thermal insulation in necessary to protect the strands of wires from melting their own individual insulation and fusing together or fusing against said aluminum sheaths. This thermal insulation is commonly provided in the prior art as exemplified by U.S. Pat. Nos. 3,233,036 and 3,325,589 by a core tape which is a laminated film of GRS/Mylar or films of polyethylene terephthalate, polypropylene, acetylated paper, etc.

While this thermal conductivity decrease goes far toward protecting the strands of wires within the core, nevertheless increased thermal conductivity protection must be had in applications where the extrusion temperature is higher for greater efficiency and where other reasons for greater protection dictate a higher degree of thermal conductivity protection.

SUMMARY OF THE INVENTION

This need for a lower thermal conductivity core wrap has now been achieved by the use of a material having a high-surface area and low bulk density as compared with materials from which it is formed (at most one-half the density of the original material), has also the further characteristic of low hydroscopicity and is suitable for short term use at high temperatures. Such low-density high-surface area material is laminated to or sandwiched between a film of continuous flexible dielectric material so as to intertrap air in such laminate and to form a laminated core shield ready to be wrapped around the strand of wires to be protected.

The purpose of this invention is, therefore, the protection of bulk multiple strand cable cores by a low thermal conductivity laminate to protect said cores from heat damage.

A further purpose of this invention is to provide an improved cable construction utilizing a laminated core wrap.

In accordance with these desired purposes, the laminated core wrap is constructed of said low thermal conductivity material laminated to a continuous flexible dielectric material, if two-ply or sandwiched between said continuous flexible dielectric material if three-ply.

The low thermal conductivity material is contemplated to have physical structure such as fabric (either woven or nonwoven), foam or corrugation. The continuous flexible dielectric material laminated thereto in a manner to give dead air spaces should have a dielectric constant of 2.0 to 4.5, preferably not above 3.5 as measured at room temperature and at 1 kc., with a dissipation factor of 0.02 percent to 1.5 percent preferably in the range of 0.04 percent to 1.5 percent.

Typical materials useful as either woven or nonwoven fabrics to be used in the low thermal conductivity layer of the laminate include polyester (such as Dacron), acrylics (such as polyacrylonitrile), polyolefins (such as polyethylene and polypropylene), cellulose (such as cellulose acetate), and glass fibers. Among the foam materials contemplated herewith are such materials as foamed polyolefins, polyurethanes, etc. Among the corrugated materials any of the categories of the materials falling in the class of polyester films, polyolefin films, cellulosic films, polyphenyleneoxide films, polycarbonate films, etc., can be used.

In all of these applications it is necessary that dead air spaces be provided for thermal insulation and that the high-surface area low-density laminate be easily pliable so as to bend around the cable core and impart a solid integrity to the strand of wires.

As the continuous flexible dielectric material, such materials as polyolefins, including polyethylene and polypropylene; polyethylene terephthalate, including MYLAR; NYLON; polyphenyleneoxide including modifications like NORYL and polycarbonates can be used in laminated form with the low thermal conductivity material.

A cable constructed in accordance with this invention has a bundle or strand of wires wrapped by the previously described laminate with the low thermal conductivity material having a thickness of 2 to 25 mils, preferably 5 to 10 mils, while the dielectric material would be of the order of from one-half mil to 15 mils, preferably 1 to 5 mils thick. The corrugated aluminum shield covering said core wrap would be of the order of 8 to 20 mils thick, preferably 8 to 10 mils thick. The thickness of the polyolefin outside covering of the cable would generally be of the order of 75 mils.

BRIEF DESCRIPTION OF THE DRAWING

Having briefly described the invention, it will now be described in sufficient detail to show the purposes and advantages of the invention and to clearly understand the manner in which the low thermal conductivity material is employed. This can best be understood by reference to accompanying FIGS. 1 and 2.

In FIG. 1 there is a perspective view of a typical cable forming operation, showing the actual plastic cable wrap being placed on the wires. FIG. 2 illustrates in cross section the finished cable as employed.

In FIG. 1 there is shown a typical cable forming operation. The joiner 11 twists together the individual strands of wires 10. This strand is now wrapped with the thermal shielding material 12 of this invention by means 13. This wrapped cable is now further shielded with slit aluminum 14 which has been passed through corrugator 15 and passed through means 16. The cable is now ready for passage through the crosshead extrusion die 17 wherein it is coated with a layer of polyethylene. This coated cable is quenched in tank 18, passed through continuous capacitance monitor 19 and then taken to windup by means of the caterpiller haul-off 20.

In FIG. 2 there is shown in cross section a telephone cable comprising multiple strands of insulated conductors assembled into a cable core 5 about which is applied a thermal barrier 4 laminated to the dielectric material 3. An aluminum sheath 2 is applied over said laminate with plastic jacket 1 extruded thereon.

DESCRIPTION OF THE PREFERRED EMBODIMENTS

In order to set forth in a more specific fashion the details of this invention, the following examples setting forth the two-step operation of laminate preparation and cable manufacture for producing multistrand electric cables will be given as follows:

EXAMPLE 1

*Laminate Preparation*—A commercially available nonwoven polyester mat such as DuPont's Spunbound Reemay 2017 (1.5 oz./sq. yd. or 30 lbs./ream basis weight) is chosen as the ply which is highly bulked and a poor thermal conductor. A 56 inch wide roll of the polyester mat is unwound through a conventional extrusion coater: a 4½ inch diameter extruder with a conventional polyethylene-type screw with a 24:1 length-to-diameter ratio. The extruder is fitted with a slot die which enables a thin coating 56 inch wide to be placed on the nonwoven mat substrate. Extruding a polypropylene with a melt flowrate of 3 at 530° F. at a rate of 500 lbs./hr. and a coating line speed of 45 feet/min. results in a 5 mil polypropylene coating on the polyester mat. Positioning of the casting roll and extrusion nip in relation to the extrusion die is adjusted so that the hot extrudate contacts the cooled casting roll before it is combined with the polyester mat, in order to minimize penetration of the polypropylene into the fibers. The polypropylene/polyester mat laminate is then trimmed in-line to eliminate the heavy coating edge and is wound in large diameter rolls (~28 inches). The rolls which are now approximately 54 inches wide are slit into narrow widths depending on the diameter of the cable core to be wrapped. Here the final core wrap tapes are 6.75 inches wide.

*Cable Manufacture*—The cable to be made is an alpeth-type low voltage communication cable. The core is composed of 600 paired conductors, 22-gauge copper, insulated with low-density polyethylene and bundled to an effective diameter of approximately 2.09 inches. The cable core is then wrapped longitudinally with the previously made rolls of 6.75 inch wide core wrap, polyester mat facing out. Immediately thereafter an 8-mil thick corrugated shield approximately 6.75 inch wide is wrapped over the corewrap. Both the corewrap laminate and the aluminum shield overlap approximately one-fourth inch. This assembly is passed through a crosshead extrusion die where an overall jacket of polyethylene some 60 mils thick is coated onto the cable. The polyethylene is usually a high density or cross-linkable low density type with a high carbon content for aging stability. Extrusion temperatures are commonly in the 430°–475° F. range, line speeds as low as 25 feet/min. The complete jacketed cable is then rapidly quenched in a water-bath and wound on a reel in 3000 ft. lengths ready for use as underground telephone cables and the like.

EXAMPLE 2

*Laminate Preparation*—A commercially available nonwoven polyester mat such as DuPont's Spunbound Reemay 2017 (1.5 oz./sq. yd. or 30 lbs./ream basis weight) is chosen as the ply which is highly bulked and a poor thermal conductor.

It is laminated on a conventional adhesives laminator to a 5-mil polypropylene film. The polypropylene is coated with a pressure-sensitive adhesive, such as a rubber cement, with a gravure-type applicator and the organic solvent is evaporated from the coating in a forced convection oven. The adhesive coated polypropylene is joined to the nonwoven polyester between two heated rolls forming the laminating nip. Typical conditions are:

| | |
|---|---|
| Adhesive Coating Weight | 3 lbs./ream |
| Drying Oven Temperature | 150° F. |
| Lamination Nip Temp. | 150° F. |
| Lamination Nip Pressure | 30 lbs./in. width |
| Lamination Speed | 250 feet/min. |

The laminate is wound to a large diameter roll and slit subsequently to narrow widths as with the laminate in example 1.

*Cable Manufacture*—The cable is similar to that in example 1.

In order to illustrate the effectiveness of the laminated product of examples 1 and 2 for cable wrap purposes, see the comparative thermal conductivity values with prior art cable wraps by the "Guarded Hot Plate Method" (ASTM C–177–63):

| | Thermal Conductivity BTU/Hr./Ft.²/°F. |
|---|---|
| 3-mil thick MYLAR film | 345 |
| 10-mil thick polypropylene film | 92 |
| Laminate of 5-mil PP film with 30 lb./ream of polyester mat. | 20 |

This large decrease in thermal conductivity then clearly illustrates the tremendous thermal conductivity decrease obtainable by the use of the laminate of examples 1 and 2.

EXAMPLE 3

*Preparation of the Laminate*—A commercially available corrugated polyester film, such as DuPont's 2-mil corrugated Mylar, is chosen as the highly bulked ply with low thermal conductivity. It is laminated on a conventional adhesives laminator to a 2-mil polypropylene film. The polypropylene is coated with a pressure-sensitive adhesive, such as a rubber cement, with a gravure-type applicator and the organic solvent is evaporated from the coating in a forced convection oven. The adhesive coated polypropylene is joined to the corrugated Mylar between two heated rolls forming the laminating nip. Typical conditions are:

| | |
|---|---|
| Adhesive Coating Weight | 3 lbs./ream |
| Drying Oven Temperature | 150° F. |
| Lamination Nip Temp. | 150° F. |
| Lamination Nip Pressure | 30 lbs./in. width |
| Lamination Speed | 250 feet/min. |

The laminate is wound to a large diameter roll and slit subsequently to narrow widths as with laminate in example 1. For this example the corewrap's final width is approximately 4.25 inches.

*Cable Manufacture*—The cable is similar to that in example 1, except smaller in diameter. The core has 50 pairs of 19-gauge wire for a core diameter of approximately 0.66 inches. The 4.25-inch corewrap again permits a one-fourth inch overlap. Extrusion jacketing speeds are typically in the 125–150 feet/min. range.

Example 4

*Laminate Preparation*—In this example, a polyolefin foam is the highly bulked ply. The laminate is formed by multiple extrusion, that is, two extruders which simultaneously feed a single die. The design of the die (e.g. U.S. Pat. No. 3,223,761, U.S. Pat. No. 3,266,093) produces an extrudate with a core of one material (10 mils thickness of polypropylene foam) and an outer layer on both sides of the foam of a second material (1 mil thickness of polyphenyleneoxide on each side).

*Cable Manufacture*—Similar to example 1.

Although this invention has been described with respect to only a few examples and embodiments, it is not to be so limited and changes and modifications may be made therein which are fully within the intended scope of the invention as defined in the following claims:

1. An electrical cable comprising:
   a. multiple strands of conductors, said conductors individually insulated electrically from one another;
   b. said multiple strands wrapped with a composite laminate comprising a film of flexible dielectric material, said film having an inner surface contiguous with said multiple strands, and an outer surface;
   c. said outer surface of said film bonded to a porous nonwoven material having a maximum bulk density of one-half of the material from which it is formed;

d. said dielectric material having a maximum dielectric constant of 3.5 measured at room temperature and 1 kc., and a dissipation factor in the range of 0.02 to 1.5 percent;
e. a corrugated aluminum shield disposed circumferentially about said composite laminate; and
f. a polyolefin insulating cover disposed externally of said aluminum shield.

2. An electrical cable according to claim 1 wherein said dielectric material is polypropylene having a thickness of 5 mils, said porous nonwoven material is a polyester mat weighing 1.5 ounces per square yard and said polyolefin insulating cover is polyethylene having a thickness of about 70 mils.